United States Patent
Matsue et al.

(10) Patent No.: US 12,473,435 B2
(45) Date of Patent: Nov. 18, 2025

(54) METHOD FOR MANUFACTURING SPHERICAL PARTICLE MATERIAL

(71) Applicant: ADMATECHS CO., LTD., Miyoshi (JP)

(72) Inventors: Ikuya Matsue, Miyoshi (JP); Tempo Nakamura, Miyoshi (JP)

(73) Assignee: ADMATECHS CO., LTD., Miyoshi (JP)

( * ) Notice: Subject to any disclaimer, the term of this patent is extended or adjusted under 35 U.S.C. 154(b) by 0 days.

(21) Appl. No.: 18/846,762

(22) PCT Filed: Mar. 14, 2023

(86) PCT No.: PCT/JP2023/009789
§ 371 (c)(1),
(2) Date: Feb. 16, 2025

(87) PCT Pub. No.: WO2023/176812
PCT Pub. Date: Sep. 21, 2023

(65) Prior Publication Data
US 2025/0179302 A1    Jun. 5, 2025

(30) Foreign Application Priority Data
Mar. 15, 2022   (JP) .................. 2022-040818

(51) Int. Cl.
C09C 1/40    (2006.01)
C09C 3/00    (2006.01)
(Continued)

(52) U.S. Cl.
CPC ............. *C09C 1/407* (2013.01); *C09C 3/006* (2013.01); *C09C 3/041* (2013.01); *C09C 3/045* (2013.01);
(Continued)

(58) Field of Classification Search
CPC ........... C09C 1/407; C09C 3/041; C09C 3/08; C09C 3/12; C01P 2004/32
See application file for complete search history.

(56) References Cited

U.S. PATENT DOCUMENTS

| | | | |
|---|---|---|---|
| 2009/0302138 A1* | 12/2009 | Roesch | C01F 7/021 241/23 |
| 2010/0051855 A1* | 3/2010 | Kunitomo | C01F 7/02 252/75 |

(Continued)

FOREIGN PATENT DOCUMENTS

| | | | |
|---|---|---|---|
| JP | 2004037159 A | 2/2004 | |
| JP | 2019182714 A | 10/2019 | |

(Continued)

OTHER PUBLICATIONS

Translation of JP2021-038125 (Year: 2021).*

(Continued)

*Primary Examiner* — Robert C Boyle
(74) *Attorney, Agent, or Firm* — Element IP, PLC

(57) ABSTRACT

An object is to provide a production method that is a method for producing a spherical particle material by a melting method and that makes a melting spheroidization ratio higher than the conventional method. A production method for a spherical particle material of the present disclosure achieving the above object includes: a raw particle material preparation step of preparing a raw particle material composed of an inorganic material; and a spheroidization step of feeding the raw particle material into a high-temperature atmosphere to melt the raw particle material and then rapidly cooling the raw particle material to prepare a spherical particle material having a volume average particle diameter of 1 μm or more and less than 10 μm, and a powder (Continued)

compressibility evaluation FF value, by a powder rheometer, of the raw particle material is 2.0 or more.

15 Claims, 2 Drawing Sheets

(51) Int. Cl.
*C09C 3/04* (2006.01)
*C09C 3/08* (2006.01)
*C09C 3/12* (2006.01)

(52) U.S. Cl.
CPC .................. *C09C 3/08* (2013.01); *C09C 3/12* (2013.01); *C01P 2004/03* (2013.01); *C01P 2004/32* (2013.01); *C01P 2004/52* (2013.01); *C01P 2004/61* (2013.01); *C01P 2006/80* (2013.01)

(56) References Cited

U.S. PATENT DOCUMENTS

| | | | | |
|---|---|---|---|---|
| 2011/0256051 | A1* | 10/2011 | Sawano | C01F 7/441 423/629 |
| 2023/0219823 | A1* | 7/2023 | Nakamura | C01F 7/025 423/625 |

FOREIGN PATENT DOCUMENTS

| | | | |
|---|---|---|---|
| JP | 2021-038125 | * | 3/2021 |
| JP | 2021038125 A | | 3/2021 |
| JP | 7597980 B2 | | 12/2024 |

OTHER PUBLICATIONS

Decision to Grant issued Oct. 29, 2024 in Japanese Patent Application No. 2024-508176 (with English translation), 5 pages.

Office Action issued Sep. 10, 2024 in Japanese Patent Application No. 2024-508176 (with English translation), 10 pages.

International Search Report issued May 30, 2023 in PCT/JP2023/009789 (with English translation), 7 pages.

Office Action issued Sep. 10, 2020 in Japanese Patent Application No. 2024-508176 (with English translation).

Written Opinion issued May 30, 2023 in PCT/JP2023/009789 (with English translation), 10 pages.

Yasuhiro Shimada et al., "A New Method for Evaluating Powder Flowability Using Constant Volume Shear Tester", J. Soc. Powder Technol., Japan, vol. 54, 2017, pp. 90-96 (with English translation).

* cited by examiner

METHOD FOR MANUFACTURING SPHERICAL PARTICLE MATERIAL

TECHNICAL FIELD

The present disclosure relates to a production method for a spherical particle material.

BACKGROUND ART

Spherical particle materials composed of inorganic materials are used as fillers for electronic materials such as fillers to be contained in semiconductor sealing materials and substrate materials. Various requirements are made for spherical particle materials in terms of particle size distribution, circularity, and purity.

As a typical conventional method for producing a spherical particle material from an inorganic material, in the case where the inorganic material is a metal oxide, there is a method (VMC method) in which a metal particle material composed of the metal constituting the metal oxide is fed into a high-temperature oxidizing atmosphere, deflagrated, and then cooled rapidly or a method (melting method) in which a particle material composed of the inorganic material is fed into a high-temperature atmosphere and then cooled rapidly.

CITATION LIST

Patent Literature

Patent Literature 1: JP2019-182714 (A)

SUMMARY OF INVENTION

Technical Problem

In the VMC method, the particle size distribution, etc., of the produced spherical particle material is controlled by controlling the particle size distribution of the metal particle material to be fed, the feeding speed, etc., but the control range thereof is not completely free. In particular, it is difficult to expand the control range when producing alumina by the VMC method.

Therefore, when a melting method that allows the produced spherical particle material to be controlled to some extent by controlling the particle size distribution of the particle material serving as a raw material was examined, the particle size distribution, etc., of the produced spherical particle material was controlled by the particle size distribution of the particle material serving as a raw material in the melting method, but melting was not completely performed in some cases. For example, when a particle material composed of alumina was spheroidized by the melting method, part of the particle material that was not melted was mixed in some cases. An indicator for the degree to which a particle material serving as a raw material is melted as described above is referred to as melting spheroidization ratio (described in detail later).

Furthermore, a method in which a large particle material produced by agglomerating a small particle material is used as a particle material serving as a raw material and is subjected to a melting method, thereby controlling a particle size distribution, is disclosed (Patent Literature 1). However, obtaining a spherical particle material having the desired particle size distribution was sometimes difficult due to defects such as destruction of the agglomerated particle material.

The present disclosure has been completed in view of the above circumstances, and an object of the present disclosure is to provide a production method that is a method for producing a spherical particle material by a melting method and that makes a melting spheroidization ratio higher than the conventional method.

Solution to Problem

In order to achieve the above object, the present inventors have conducted thorough studies. As a result, the present inventors have found that a powder compressibility evaluation FF value by a powder rheometer correlates with the magnitude of the melting spheroidization ratio for a raw material to be subjected to the melting method, and have completed the following invention.

A production method for a spherical particle material of the present disclosure achieving the above object includes:
  a raw particle material preparation step of preparing a raw particle material composed of an inorganic material; and
  a spheroidization step of feeding the raw particle material into a high-temperature atmosphere to melt the raw particle material and then rapidly cooling the raw particle material to prepare a spherical particle material having a volume average particle diameter of 1 μm or more and less than 10 μm, wherein
  a powder compressibility evaluation FF value, by a powder rheometer, of the raw particle material is 2.0 or more.

The powder compressibility evaluation FF value (hereinafter referred to simply as "FF value" in this specification) means a fluidity index and is a value calculated by maximum principal stress (MPS)/unconfined yield stress (UYS). Specifically, the powder compressibility evaluation FF value is a value measured in a shear stress test with a powder fluidity analyzer, FT4 Powder Rheometer of Freeman Technology.

Advantageous Effects of Invention

As a result of having the above configuration, the production method for a spherical particle material of the present disclosure makes it possible to obtain spherical particle material having a high melting spheroidization ratio or a small specific surface area, and provides a spherical particle material that is preferable when contained as a filler in a resin composition.

DESCRIPTION OF EMBODIMENTS

Figure 1:
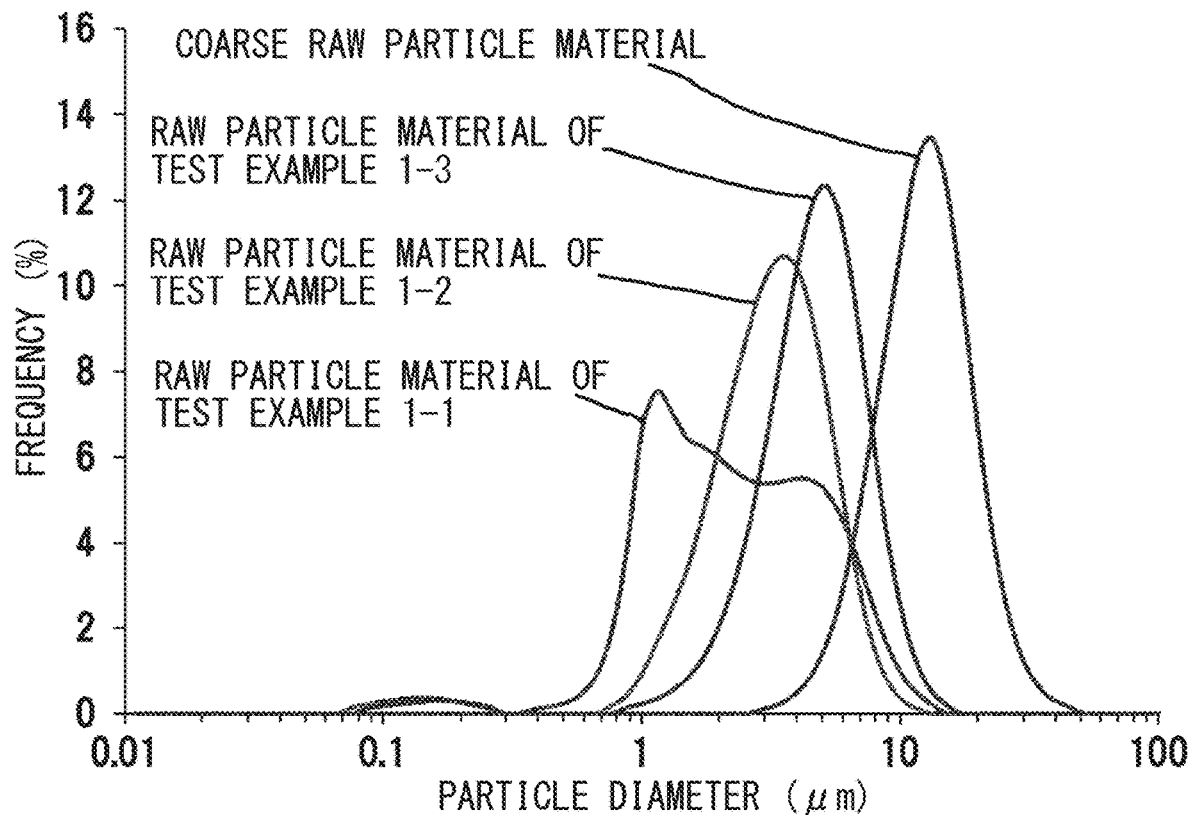
FIG. 1 is a graph showing the particle size distributions of raw particle materials in Test 1 of an example.

The production method for a spherical particle material of the present disclosure will be described in detail based on the following embodiment. A resin composition is formed by filling a resin material with spherical particles produced by a production method for a spherical particle material of the present embodiment, as a filler. The resin composition is suitable for electronic materials.

The production method for a spherical particle material of the present t embodiment includes a raw particle material preparation step, a spheroidization step, and other steps selected as necessary. The spherical particle material produced by the production method for a spherical particle material of the present embodiment is composed of an inorganic material, and has a volume average particle diameter of 1 μm or more and less than 10 μm. Examples of the lower limit of the volume average particle diameter include 1 μm, 2 μm, and 3 μm, and examples of the upper limit of the volume average particle diameter include 4 μm, 5 μm, and 6 μm. These lower and upper limits may be combined as desired.

The spherical particle material produced by the production method of the present embodiment has a circularity of 0.9 or more, preferably 0.95 or more, more preferably 0.98 or more, and further preferably 0.99 or more. The circularity in this specification is calculated as value a calculated by (circularity)=$\{4\pi\times(area)\div(perimeter)^2\}$ from the area and perimeter of a particle observed when a photograph is taken by an SEM. The closer the value is to 1, the closer the particle is to a complete sphere. Specifically, an average value obtained by measuring 100 or more particles using image analysis software (Asahi Kasei Engineering Corporation: A-zou-kun) is adopted.

The inorganic material constituting the spherical particle material of the present embodiment is not particularly limited, and is preferably a metal oxide, and in particular, examples of the inorganic material include alumina, silica, titania, zirconia, magnesia, and composite oxides thereof. As the inorganic material, in particular, the above-described metal oxides are used individually or used in combination and preferably contained in an amount of 50% or more based on the mass of the entire inorganic material, and 50% or more of alumina is more preferably contained.

The total content of alkali metals and alkaline earth metals as impurities in the inorganic material is preferably 5 ppm or less, more preferably 3 ppm or less, and further preferably 1 ppm or less. In particular, the content of Na is preferably 5 ppm or less, more preferably 3 ppm or less, and further preferably 1 ppm or less.

Furthermore, the total content of U and Th as impurities in the inorganic material is preferably 5 ppb or less, more preferably 3 ppb or less, and further preferably 1 ppb or less.

In the case where the inorganic material is alumina, the inorganic material has a specific surface area of preferably 1.0 $m^2/g$ or less and further preferably 0.8 $m^2/g$ or less. The inorganic material preferably has a melting spheroidization ratio of 85% or more. Examples of the lower limit of the melting spheroidization ratio include 88%, 90%, 92%, 94%, 95%, 96%, 97%, 98%, and 99%. The method for measuring the melting spheroidization ratio will be described later in the Examples.

Raw Particle Material Preparation Step

The raw particle material preparation step is a step of preparing a raw particle material composed of an inorganic material. As the inorganic material, a material that is the same as the inorganic material constituting the spherical particle material to be produced may be used. A powder compressibility evaluation FF value, by a powder rheometer, of the raw particle material is 2.0 or more, preferably 2.5 or more, more preferably 3.0 or more, and further preferably 4.0 or more.

The FF value is controlled by the particle shape of the raw particle material, surface treatment, and a particle size distribution. In the case where the content of particles having a particle diameter smaller than 1 μm is 2% or more based on the mass of the entire raw particle material, the FF value is increased by decreasing the circularity of the raw particle material. In this case, the circularity is preferably 0.9 or less, more preferably 0.88 or less, and further preferably 0.85 or less. Conversely, in the case where the content of particles having a particle diameter smaller than 1 μm is 2% or less based on the mass of the entire raw particle material, the raw particle material preferably has a higher circularity. In this case, the circularity is preferably 0.85 or more, more preferably 0.88 or more, and further preferably 0.90 or more.

For the surface treatment, surface treatment agents that introduce trimethylsilyl groups, isocyanate groups, amino groups, and phenyl groups as functional groups are preferably used. For example, an aluminate-based coupling agent or silane compound having a functional group to be introduced may be reacted (surface treatment step).

Examples of the aluminate-based coupling agent include acetoalkoxyaluminum diisopropylate, aluminum alkylacetoacetate diisopropylate, aluminum ethylacetoacetate diisopropylate, aluminum trisethylacetoacetate, aluminum isopropylate, aluminum diisopropylate monosecondary butyrate, aluminum secondary butyrate, aluminum ethylate, aluminum bisethylacetoacetate monoacetylacetonate, aluminum trisacetylacetonate, and aluminum monoisopropoxy monooleoxy ethylacetoacetate.

The surface treatment is preferably performed to the extent that the FF value is 2.0 or more. For example, the treatment amount is preferably about 0.5 μmol to 10 μmol based on the mass of the raw particle material, examples of the lower limit thereof include about 0.6 μmol and 0.7 μmol, and examples of the upper limit thereof include about 6.0 μmol and 7.0 μmol. These lower and upper limits may be combined as desired.

As for the particle size distribution, the smaller the dispersion of the particle size distribution is, the higher the FF value is. For example, D90/D10 is preferably 1.5 or less and more preferably 1.2 or less. As a method for reducing the dispersion, preferably, the particle diameters of the raw particle material are made uniform, or particles having a particle diameter smaller than 1 μm are removed. As a method for removing the small particles, a general method may be employed, and examples thereof include a method with a cyclone, a method with a sieve, and a method based on the difference in sedimentation speed in a fluid.

A particle material having a volume average particle diameter larger than the volume average particle diameter required for the raw particle material may be used as a coarse raw particle material, and by performing a pulverization operation on the coarse raw particle material, the coarse raw particle material may be made into a raw particle material having the required volume average particle diameter. For example, the particle size distribution may be adjusted after the coarse raw particle material is pulverized. Also, instead of or in addition to adjusting the particle size distribution after pulverization, the particle size distribution may be adjusted before pulverization. As for the adjustment of the particle size distribution, removing particles having a small particle diameter as described above is particularly preferable.

The coarse raw particle material is preferably produced by a VMC method (deflagration step). The particle material produced by the VMC method may also be used as a raw particle material as it is. The deflagration step is a step of preparing a raw particle material or a coarse raw particle material by deflagrating a metal particle material composed of a metal (metallic aluminum or the like) constituting a metal oxide in a high-temperature oxidizing atmosphere.

For example, when alumina is produced by the VMC method, a mixture of a particle material having a large particle diameter and a particle material having a small particle diameter is obtained, so that the mixture may be classified to obtain a fraction having a large particle diameter, and the fraction may be used as a coarse raw particle material.

The pulverization method is not particularly limited, and general pulverization methods such as jet mills, ball mills, and vibratory ball mills may be employed. Jet mills are particularly preferable since impurities derived from a medium, etc., used for pulverization are less contaminated and the pulverization efficiency on the micrometer order is high. The particle material produced by the VMC method has a high circularity and may contain a certain amount of particles having a particle diameter smaller than 1 μm in the particle size distribution. Therefore, the FF value is made to tend to increase by decreasing the circularity through pulverization.

Preferably, the particle material composed of the metal oxide produced by the VMC method is used as a coarse raw particle material as it is, or is classified and used as a coarse raw particle material. This is because the metal constituting the metal particle material as the raw material for the VMC method is more easily purified than a metal oxide thereof and thus it is easier to increase the purity of the raw particle material obtained through the VMC method.

The impurity content (alkali metals, alkaline earth metals, Na, U, Th, etc.) of the metal particle material is preferably an impurity content equal to or lower than that of the inorganic material constituting the spherical particle material of the present embodiment described above.

Spheroidization Step

The spheroidization step is a method similar to a spherical particle material production method referred to as melting step. This method is a method in which the raw particle material is melted by feeding the raw particle material into a high-temperature atmosphere, and then cooled rapidly, thereby producing a spherical particle material.

The temperature of the high-temperature atmosphere is equal to or higher than the melting point of the inorganic material constituting the raw particle material. In the case where the inorganic material constituting the raw particle material is alumina, the temperature of the high-temperature atmosphere is preferably 2000° C. or higher and more preferably 3000° C. or higher.

As a method for forming the high-temperature atmosphere, using a flame formed by combustion of a combustible gas together with an auxiliary combustible gas is preferable. Examples of the combustible gas include hydrocarbon gases such as propane and natural gas, hydrogen gas, and ammonia gas. Examples of the auxiliary combustible gas include oxygen and air.

A flame is formed inside a furnace body, and the raw material particle material is fed into the furnace body in a state where the raw particle material is dispersed in an appropriate carrier (gas or liquid). By decreasing the concentration of the raw particle material to be dispersed in the carrier such that the particles of the raw particle material are not fused together, a spherical particle material having a particle size distribution similar to the particle size distribution of the fed raw particle material is obtained, or by increasing the concentration of the raw particle material to be dispersed in the carrier such that the particles of the raw particle material are fused together, a spherical particle material whose particle diameter is shifted to the large side as compared to the particle size distribution of the fed raw particle material is obtained.

The melted raw particle material is rapidly cooled and solidified by moving outside the high-temperature atmosphere to become a spherical particle material. The produced spherical particle material is collected by a cyclone, a bag filter, or the like.

The produced spherical particle material may be subjected to surface treatment. For example, the surface treatment may be performed with the above-described silane compound.

EXAMPLES

The production method for a spherical particle material of the present disclosure will be described specifically by means of an example.

(Test 1)

Alumina produced by the VMC method (AO-909, manufactured by ADMATECHS COMPANY LIMITED, volume average particle diameter: 10 μm, produced by a deflagration step) from which fine powder was removed, was used as a coarse raw particle material. The particle size distribution of the coarse raw particle material was adjusted by pulverizing the coarse raw particle material using a jet mill (pulverization step), and three types of raw particle materials having volume average particle diameters of 2.1 μm (Test Example 1-1), 3.0 μm (Test Example 1-2), and 4.1 μm (Test Example 1-3) were obtained (collectively referred to as raw particle material preparation step). The obtained raw particle materials were fed into a high-temperature atmosphere (about 2000° C.) and cooled rapidly to produce spherical particle materials (spheroidization step).

Figure 2:
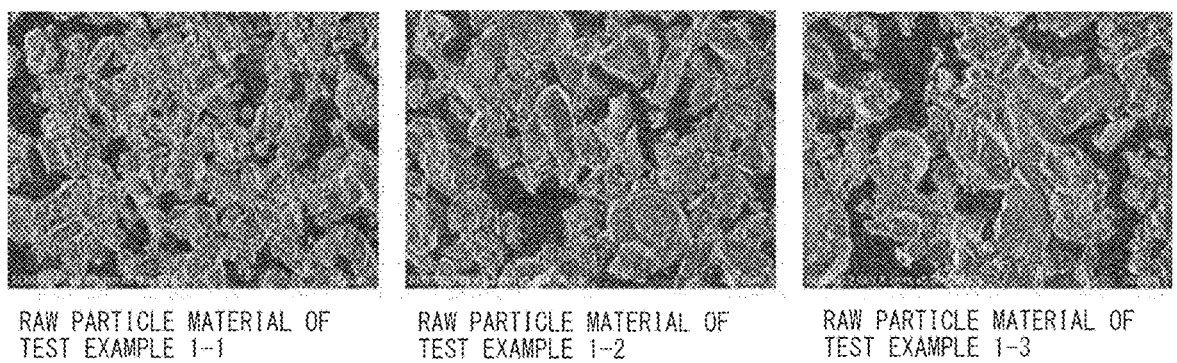
FIG. 2 shows SEM photographs of the raw particle materials in Test 1 of the example.

For the raw particle material of each test example, the specific surface area measured by the BET method using nitrogen, the moisture content measured by the Karl Fischer method (KF moisture content), the uranium content (U) and thorium content (Th) measured by an inductively coupled plasma emission spectrophotometer, and the FF value (maximum principal stress (MPS) and unconfined yield stress (UYS) are also listed) were measured and are shown in Table 1. The results of measuring the particle size distribution of the raw particle material of each test example are shown in FIG. 1, and an SEM photograph of the raw particle material of each test example is shown in FIG. 2.

Figure 3:
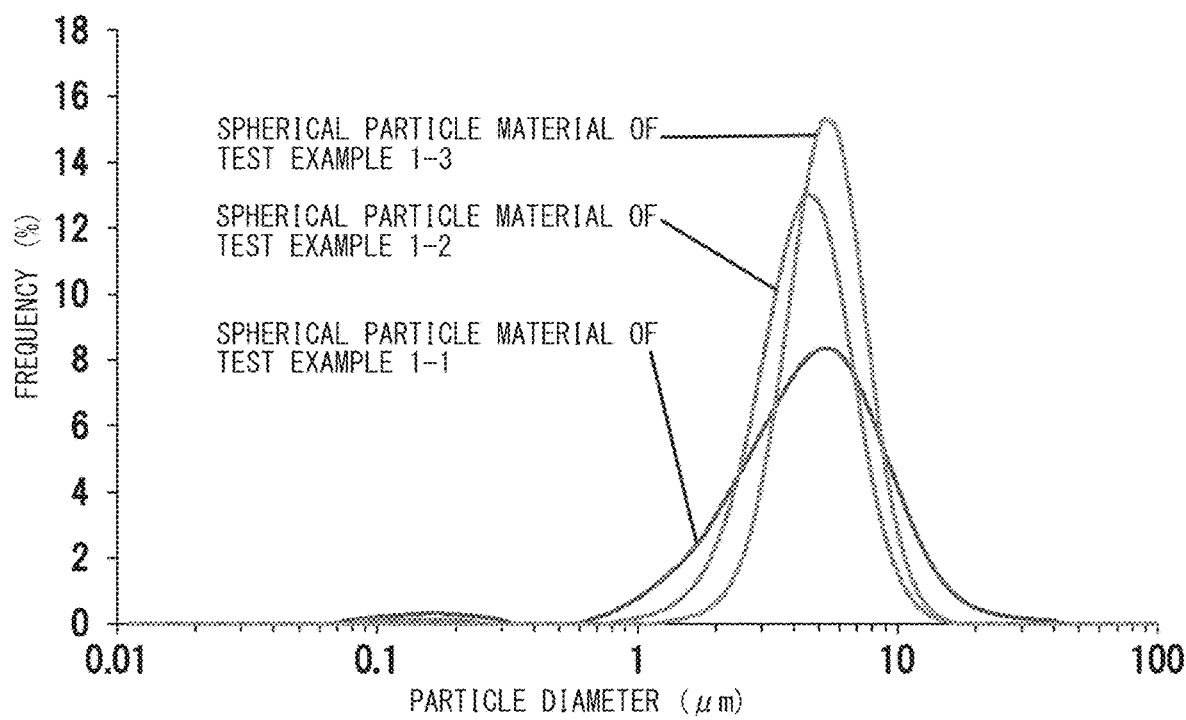
FIG. 3 is a graph showing the particle size distributions of spherical particle materials in Test 1 of the example.
Figure 4:
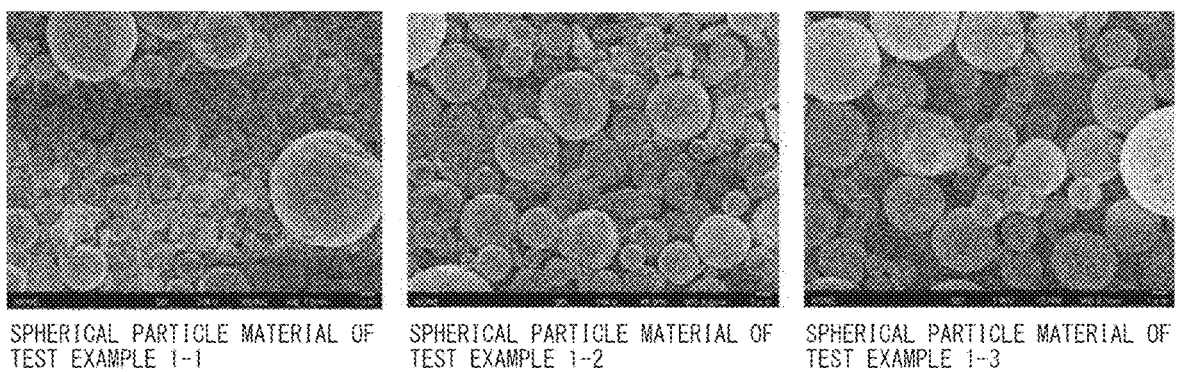
FIG. 4 shows SEM photographs of the spherical particle materials in Test 1 of the example.

The raw particle material of each test example was subjected to a spheroidization step. In the spheroidization step, the raw particle material was dispersed in oxygen as a carrier gas at 7.5 Nm$^3$/h and fed into a flame at a feeding rate of 10 kg/h. The flame was formed by LPG as a combustible gas at 7.5 Nm$^3$/h and oxygen as an auxiliary combustible gas at 9.0 Nm$^3$/h. Sheath gas and oxygen as auxiliary combustible gas at 21.0 Nm$^3$/h were caused to flow in. The raw particle material was fed into the flame, melted, and then cooled rapidly to obtain a spherical particle material. The obtained spherical particle material was collected by a bag filter. For the spherical particle material of each test sample, the particle diameter (D50), the mode diameter, the specific surface area, the KF moisture content, and the U and Th contents were measured by the above-described methods and are shown in Table 1. The results of measuring the particle size distribution of the spherical particle material of each test example are shown in FIG. 3, and an SEM photograph of the spherical particle material of each test example is shown in FIG. 4.

The melting spheroidization ratio was also measured and is shown in Table 1. The melting spheroidization ratio is a value calculated from the following equation, assuming that a completely melted sample (the melting spheroidization ratio is 100%) is a perfect sphere, and that the closer the sphere is to a perfect sphere, the more the melting proceeds.

(Melting spheroidization ratio)=[1−{(specific surface area of spherical particle material)−(specific surface area when melting spheroidization ratio of spherical particle material is assumed to be 100%)}/{(specific surface area of raw particle material)−(specific surface area when melting spheroidization ratio of raw particle material is assumed to be 100%)}]×100(%)

(Specific surface area when melting spheroidization ratio of spherical particle material is assumed to be 100%)=6/{(true specific gravity of inorganic material constituting spherical particle material)×(D50 of spherical particle material)}

(Specific surface area when melting spheroidization ratio of raw particle material is assumed to be 100%)=6/{(true specific gravity of inorganic material constituting spherical particle material)×(D50 of raw particle material)}    Equation (1):

Here, in Equation (1), the unit of the specific surface area is ($m^2/g$), the unit of D50 is (μm), and the unit of the true specific gravity is ($g/cm^3$).

spheroidization ratio close to 100% and also had a smaller specific surface area. In addition, the spherical particle material produced from the raw particle material of Test Example 1-2 having an FF value of 2.0 or more had a slightly lower melting spheroidization ratio but a significantly smaller specific surface area than the spherical particle material produced from the raw particle material of Test Example 1-1 having an FF value of less than 2.0. Basically, the individual spherical particle material of each test example has a high circularity, and thus a larger specific surface area means that the content ratio of particles having a particle diameter smaller than D50 is higher, that is, dispersion is larger.

As is obvious from FIG. 1, the raw particle material of Test Example 1-1 has a large peak of about 1 μm and a shoulder peak of about 4 μm, has a high content of particles having a relatively small particle diameter, and has a broad particle size distribution. Therefore, the spherical particle material of Test Example 1-1 also has a high content of particles having a relatively small particle diameter and has a broad particle size distribution. This is also obvious from the SEM photograph in FIG. 4. As is obvious from FIGS. 1 and 2, the raw particle materials of Test Examples 1-2 and 1-3 have a narrower particle size distribution than the raw particle material of Test Example 1-1.

As is obvious from FIG. 3, the spherical particle material of Test Example 1-1 has a broader particle size distribution

TABLE 1

| | Raw particle material | | | | | | | |
|---|---|---|---|---|---|---|---|---|
| | Particle diameter(D50) (μm) | Specific surface area ($m^2/g$) | KF moisture content (ppm) | U (ppb) | Th (ppb) | FF value | MPS kPa | UYS kPa |
| Coarse raw particle material | 11.8 | 0.3 | 169 ppm | — | — | — | — | — |
| Test Example 1-1 | 2.1 | 5.3 | 0.42% | 0.40 | 0.43 | 1.9 | 17.6 | 9.0 |
| Test Example 1-2 | 3.0 | 3.6 | 0.26% | 0.41 | 0.54 | 2.6 | 16.9 | 6.4 |
| Test Example 1-3 | 4.4 | 2.6 | 0.17% | 0.42 | 0.48 | 3.4 | 16.0 | 4.7 |

| | Spherical particle material | | | | | | |
|---|---|---|---|---|---|---|---|
| | Particle diameter (D50) (μm) | Mode diameter (μm) | Specific surface area ($m^2/g$) | KF moisture content (ppm) | U (ppb) | Th (ppb) | Melting spheroidization ratio |
| Coarse raw particle material | — | — | — | — | — | — | — |
| Test Example 1-1 | 4.4 | 4.8 | 1.01 | 428 | 0.40 | 0.43 | 86.5% |
| Test Example 1-2 | 4.1 | 4.2 | 0.84 | 398 | 0.41 | 0.54 | 85.9% |
| Test Example 1-3 | 4.9 | 4.8 | 0.55 | 267 | 0.42 | 0.48 | 90.6% |

As is obvious from the table, the spherical particle material produced from the raw particle material of Test Example 1-3 having an FF value of 3.0 or more had a melting than the spherical particle materials of Test Examples 1-2 and 1-3, and also has a larger specific surface area than the spherical particle materials of Test Examples 1-2 and 1-3.

(Test 2)

Alumina produced by the VMC method (AO-909, manufactured by ADMATECHS COMPANY LIMITED, volume average particle diameter: 10 μm) from which fine powder was removed, was used as a coarse raw particle material. The particle size distribution of the coarse raw particle material was adjusted by pulverizing the coarse raw particle material using a jet mill, and two types of raw particle materials having volume average particle diameters of 2.0 μm (Test Example 2-1) and 4.1 μm (Test Example 2-2) were obtained. Surface treatment was performed on the obtained raw particle materials by reacting an aluminum-based coupling agent (PLENACT AL-M, manufactured by Ajinomoto Fine-Techno Co., Inc., acetoalkoxyaluminum diisopropylate) or hexamethyldisilazane (HMDS) as a surface treatment agent. The amounts of the surface treatment agents are shown in Table 2.

For the raw particle material of each test example, Cohesion, UYS, and MPS were measured using a powder rheometer and are shown in Table 2. The FF value was calculated from UYS and MPS and is shown in Table 2.

TABLE 2

| | Particle diameter (μm) | Surface treatment agent | Treatment amount (mass %) | Cohesion (kPa) | UYS (kPa) | MPS (kPa) | FF value |
|---|---|---|---|---|---|---|---|
| Test Example 2-1 | 1.5 | — | 0.00 | 2.4 | 10 | 19.3 | 1.9 |
| Test Example 2-2 | | Aluminum-based coupling agent | 0.08 | 2.1 | 8.4 | 18.5 | 2.2 |
| Test Example 2-3 | | | 0.50 | 2.3 | 8.7 | 19.3 | 2.2 |
| Test Example 2-4 | | | 1.00 | 2.3 | 9.3 | 20.1 | 2.2 |
| Test Example 2-5 | | HMDS | 0.05 | 1.7 | 6.5 | 17.9 | 2.7 |
| Test Example 2-6 | 3.0 | — | 0.00 | 2.5 | 9.4 | 17.8 | 1.9 |
| Test Example 2-7 | | HMDS | 0.05 | 2.6 | 9.8 | 18.9 | 1.9 |

As is obvious from the table, as for the samples having a particle diameter of 1.5 μm, the FF values of Test Examples 2-2 to 2-5 in which surface treatment was performed were improved as compared to Test Example 2-1 in which no surface treatment was performed. In particular, the FF value of Test Example 2-5 treated with HMDS was improved as compared to the examples treated with the aluminum-based coupling agent. As for the aluminum-based coupling agent, almost no change in FF value was observed even when the treatment amount was varied.

As for the samples having a particle diameter of 3.0 μm, even in Test Example 2-7 in which surface treatment was performed with AMDS, which is a highly effective surface treatment agent, no improvement in FF value was observed as compared to Test Example 2-6 in which no surface treatment was performed. That is, it was found that the effect of the surface treatment became smaller when the particle diameter was larger.

The invention claimed is:

1. A production method for a spherical particle material, comprising:

a raw particle material preparation step of preparing a raw particle material composed of an inorganic material containing 50 mass % or more of alumina; and a spheroidization step of feeding the raw particle material into a high-temperature atmosphere to melt the raw particle material and then cooling the raw particle material to prepare a spherical particle material having a volume average particle diameter of 1 μm or more and less than 10 μm, wherein the raw particle material preparation step includes a pulverization step of pulverizing a spherical coarse raw particle material composed of the inorganic material and having a larger volume average particle diameter than the raw particle material such that particles having a particle diameter of less than 1 μm have a content of 2% or more based on a mass of the raw particle material and have a sphericity of 0.9 or less, to obtain a powder compressibility evaluation FF value, by a powder rheometer, of 2.0 or more.

2. The production method for a spherical particle material according to claim 1, wherein the raw particle material preparation step includes a surface treatment step of performing surface treatment on the raw particle material with a surface treatment agent, and the surface treatment step is combined with the pulverization step to obtain a powder compressibility evaluation FF value, by a powder rheometer, of 2.0 or more.

3. The production method for a spherical particle material according to claim 2, wherein the spherical particle material prepared by the spheroidization step is composed only of alumina, and the surface treatment agent is an aluminate-based coupling agent.

4. The production method for a spherical particle material according to claim 1, wherein the raw particle material preparation step includes a deflagration step of preparing the coarse raw particle material by deflagrating a metal particle material composed of metallic aluminum in a high-temperature oxidizing atmosphere.

5. The production method for a spherical particle material according to claim 2, wherein the raw particle material preparation step includes a deflagration step of preparing the coarse raw particle material by deflagrating a metal particle material composed of metallic aluminum in a high-temperature oxidizing atmosphere.

6. The production method for a spherical particle material according to claim 3, wherein the raw particle material preparation step includes a deflagration step of preparing the coarse raw particle material by deflagrating a metal particle material composed of metallic aluminum in a high-temperature oxidizing atmosphere.

7. The production method for a spherical particle material according to claim 4, wherein
   a content of Na in the metal particle material is 5 ppm or less, and
   a content of Na in the spherical particle material is 5 ppm or less.

8. The production method for a spherical particle material according to claim 5, wherein
   a content of Na in the metal particle material is 5 ppm or less, and
   a content of Na in the spherical particle material is 5 ppm or less.

9. The production method for a spherical particle material according to claim 6, wherein
   a content of Na in the metal particle material is 5 ppm or less, and
   a content of Na in the spherical particle material is 5 ppm or less.

10. The production method for a spherical particle material according to claim 4, wherein
    a total content of U and Th in the metal particle material is 5 ppb or less, and
    a total content of U and Th in the spherical particle material is 5 ppb or less.

11. The production method for a spherical particle material according to claim 5, wherein
    a total content of U and Th in the metal particle material is 5 ppb or less, and
    a total content of U and Th in the spherical particle material is 5 ppb or less.

12. The production method for a spherical particle material according to claim 6, wherein
    a total content of U and Th in the metal particle material is 5 ppb or less, and
    a total content of U and Th in the spherical particle material is 5 ppb or less.

13. The production method for a spherical particle material according to claim 7, wherein
    a total content of U and Th in the metal particle material is 5 ppb or less, and
    a total content of U and Th in the spherical particle material is 5 ppb or less.

14. The production method for a spherical particle material according to claim 8, wherein
    a total content of U and Th in the metal particle material is 5 ppb or less, and
    a total content of U and Th in the spherical particle material is 5 ppb or less.

15. The production method for a spherical particle material according to claim 9, wherein
    a total content of U and Th in the metal particle material is 5 ppb or less, and
    a total content of U and Th in the spherical particle material is 5 ppb or less.

* * * * *